United States Patent [19]

Shaw

[11] Patent Number: 4,459,063
[45] Date of Patent: Jul. 10, 1984

[54] BUILDING CONSTRUCTION

[76] Inventor: Christopher B. Shaw, 9 Brodie Rd., Guildford, Surrey GU1 3RZ, England

[21] Appl. No.: 445,046

[22] Filed: Nov. 29, 1982

Related U.S. Application Data

[63] Continuation of Ser. No. 176,147, Aug. 7, 1980.

[51] Int. Cl.³ .............................................. F16L 9/00
[52] U.S. Cl. ..................................... 405/124; 405/150
[58] Field of Search ............... 405/124, 125, 126, 146, 405/152, 150, 118, 119; 52/576, 577, 381

[56] References Cited

U.S. PATENT DOCUMENTS

| | | | |
|---|---|---|---|
| 832,017 | 9/1906 | Hummel | 405/126 |
| 905,290 | 12/1908 | Cummings et al. | 405/126 |
| 1,412,616 | 4/1922 | Kammerer | 405/126 X |
| 1,746,566 | 2/1930 | Tufts | 405/149 |
| 1,846,197 | 2/1932 | Goldsmith . | |
| 1,861,436 | 6/1932 | Collins | 405/154 X |
| 1,909,984 | 5/1933 | Prindle | 52/577 |
| 1,926,843 | 9/1933 | Fischer | 405/126 X |
| 2,792,164 | 5/1957 | Cauffiel | 52/577 X |
| 3,381,479 | 5/1968 | Curzio | 405/150 |
| 3,508,406 | 4/1970 | Fisher | 405/124 |
| 3,550,382 | 12/1970 | Khodosh et al. | 405/146 X |
| 3,859,802 | 1/1975 | Platner et al. | 405/152 |
| 4,050,255 | 9/1977 | Ahlgren . | |
| 4,141,666 | 2/1979 | DeGraff | 405/150 X |
| 4,211,504 | 7/1980 | Sivachenko | 405/150 X |

FOREIGN PATENT DOCUMENTS

| | | |
|---|---|---|
| 496476 | 11/1938 | United Kingdom . |
| 496475 | 11/1938 | United Kingdom . |
| 520399 | 4/1940 | United Kingdom . |
| 1071497 | 6/1967 | United Kingdom . |
| 1088986 | 10/1967 | United Kingdom . |
| 1184664 | 3/1970 | United Kingdom . |

Primary Examiner—Dennis L. Taylor
Attorney, Agent, or Firm—Sherman & Shalloway

[57] ABSTRACT

The invention relates to the construction of culverts, tunnels or the like. One known method of constructing a culvert uses precast reinforced concrete units which are heavy, require mechanical handling and are expensive to transport. Another known method is to construct a culvert by building brick or concrete walls and erecting a concrete roof. This method is also expensive and is a time consuming operation.

The specification discloses a prefabricated culvert unit comprising opposed side walls joined by a top wall and wherein each side wall terminates in a foot member extending substantially normal to the wall, the unit being constructed from glassfibre reinforced cement (GRC). The feet members are supported on and secured to a concrete base surface in such a manner that there is a liquid-tight seal between the feet and the base surface. Concrete is then poured around the side walls and over the top wall of the unit or a plurality of units joined in line to complete the culvert.

15 Claims, 6 Drawing Figures

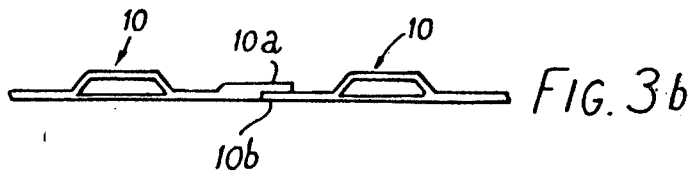
FIG. 3a
FIG. 3b
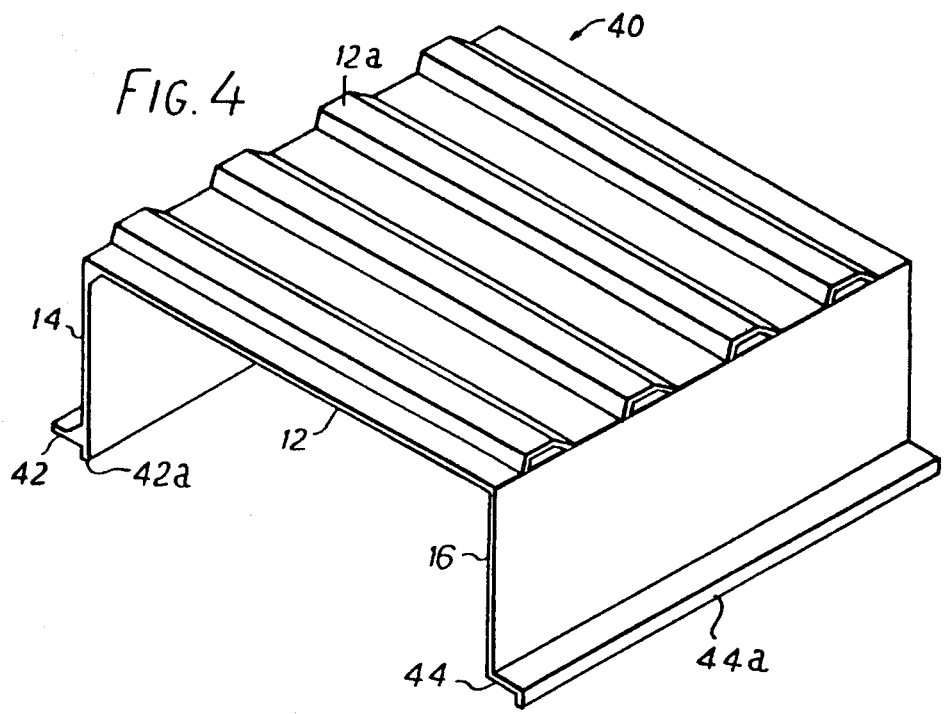
FIG. 4
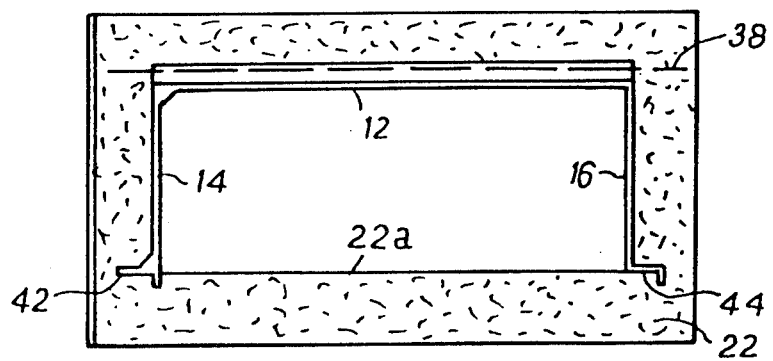
FIG. 5

BUILDING CONSTRUCTION

This is a continuation of application Ser. No. 176,147, filed Aug. 7, 1980.

FIELD OF THE INVENTION

This invention relates to a method of and apparatus for building construction and concerns methods and apparatus suitable for use in constructing culverts, tunnels and the like.

DESCRIPTION OF THE PRIOR ART

A box culvert is a large rectangular sewer generally used for carrying surface water. Such culverts are often used when a stream or river passes under a road, railway line or the like and can be from about 1 meter wide by 500 mm deep internally up to about 5 meters wide and 2.5 meters deep internally. They are also used for diverting a length of stream underground where required. One well known method of constructing such a culvert uses precast reinforced concrete units which are rectangular in section. They are heavy, require mechanical handling and are expensive to transport. In some cases, precast units are not used because of the problems of access, handling and the like and in this case, the usual method of construction is to use a concrete base with brick or concrete walls and a concrete roof. Culverts constructed by this method are slow and expensive to build. The problem with small culverts is getting into the culvert to remove the roof formwork. To overcome this, it is possible to use permanent formwork units which are placed on the top of the walls and then the reinforcement added and the concrete poured. Another problem with building culverts is that the water that would normally be flowing in the stream has to be pumped past the section of stream in which the work is being carried out. This can cause complaints from nearby residents if the pumps have to be left on for long periods, particularly at night. Also, the pumps are expensive and if they break down, the works get flooded.

It is an object of the invention to provide a relatively simple and quick method of constructing a culvert, tunnel or the like.

SUMMARY OF THE INVENTION

According to the invention there is provided a method of constructing a culvert, tunnel or the like comprising securing on a prepared base a prefabricated unit comprising opposed side walls joined by a top wall, each side wall terminating in a foot member extending substantially normally thereto, the feet members being supported by the base.

The method may comprise the step of providing means for forming a liquid-tight seal between each foot member and the base.

The unit may be situated between outer wall members in spaced relation to said side walls of said unit and terminating at their upper edges above the top of said prefabricated unit, and the method may further comprise pouring a plastic building material between said side walls and said outer wall members to a height which covers said top wall and allowing the plastic building material to set.

Further, according to the invention there is provided a culvert, tunnel or the like comprising a prefabricated unit secured to a base surface, the unit comprising opposed side walls joined by a top wall, each side wall terminating in a foot member extending substantially normal thereto, the feet members being supported on and secured to said base surface.

A liquid-tight seal may be provided between the feet and the base surface.

BRIEF DESCRIPTION OF THE DRAWINGS

The invention will now be described by way of example with reference to the accompanying drawings, in which:

FIG. 4 is an isometric view of another embodiment of a prefabricated unit for use in the construction of a culvert, and FIG. 5 is a cross-sectional view of a culvert embodying a unit according to FIG. 4.

DETAILED DESCRIPTION OF THE DRAWINGS

Figure 1:
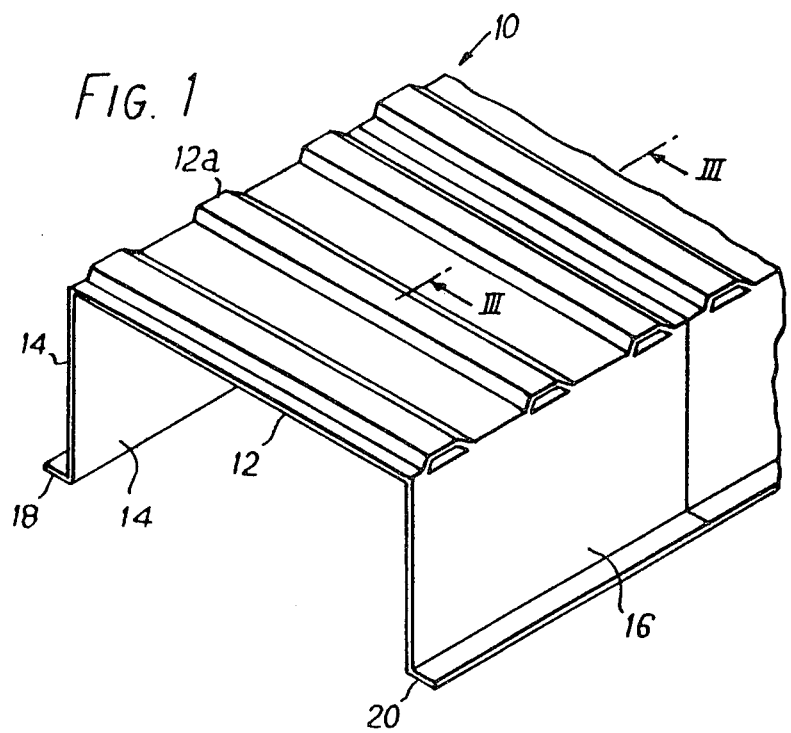
FIG. 1 shows an isometric view of one embodiment of a prefabricated unit for use in the construction of a culvert.
Figure 2:
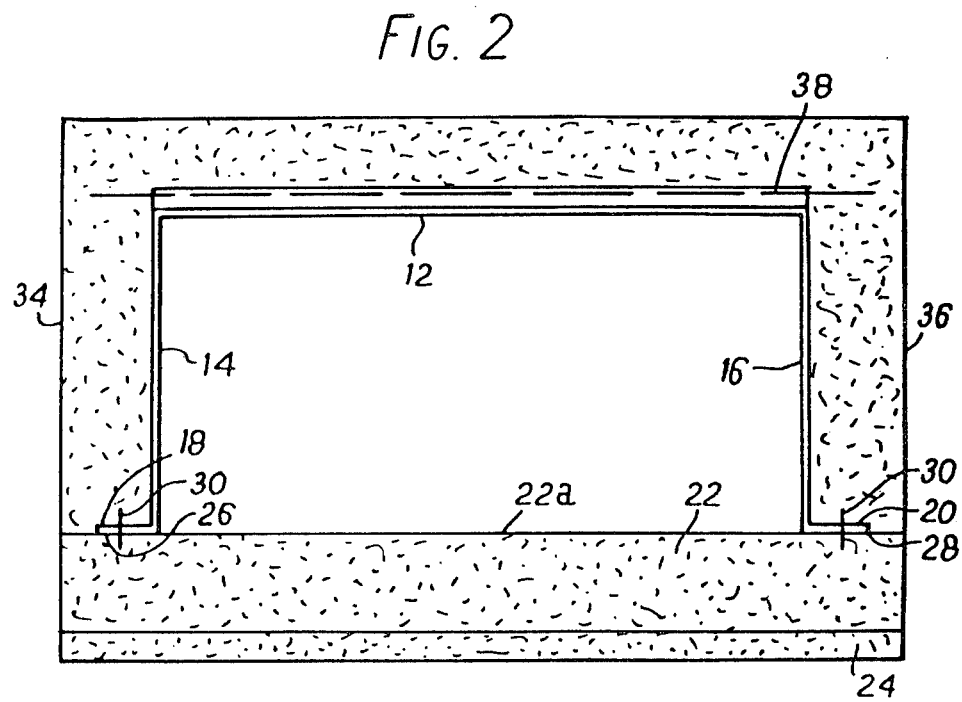
FIG. 2 is a cross-sectional view of a culvert embodying a unit according to FIG. 1, FIGS. 3(a) and (b) show parts of two prefabricated units joined together in two preferred ways according to the invention.

Referring to FIGS. 1, 2, 3 of the drawings, there is shown a prefabricated culvert unit 10 comprising a strengthened top wall 12, side walls 14, 16 terminating in feet 18, 20 respectively manufactured as an integral unit of glassfibre reinforced cement (GRC). The cross-sectional size of the unit is determined by the quantity of water required to pass down the culvert. Strengthening ribs 12a form an integral part of the top wall 12 and extend transversely across it. The thickness of the walls and dimensions of strengthening ribs 12a will be determined according to the width of the culvert and the loading on it. It would also be possible to incorporate further reinforcement on the top wall 12 and/or within the strengthening ribs 12a during manufacture of the unit if desired. Likewise the side walls could be provided with strengthening ribs similar to ribs 12a.

To construct a culvert, the water which will eventually be carried by the culvert is over-pumped, a trench is excavated and a concrete base 22 is poured, over a preformed concrete blinding 24. When the concrete base 22 has set, a plurality of the units 10 are placed in position end to end on the base 22 for the required length of culvert. Preformed flexible sealant strips 26, 28 are placed between the undersurface of the feet 18, 20 respectively and the upper surface 22a of the base 22. The units 10 are then fixedly secured to the base 22 by, for example, shot-fired nails 30 to prevent lateral movement of the walls during construction of the culvert. The sealing strips 26, 28 provide a substantially water-tight seal between the feet of the culvert unit and the base 22.

Adjacent culvert units can be joined together in a variety of ways, two of which are shown in FIGS. 3(a) and 3(b). In FIG. 3(a) adjacent end edges of the side walls 14, 16 and top wall 12 of adjacent units are butted together and then a strip of a sealing material 32 such as a self-adhesive, foil faced, bituminous sealing strip is secured over the outer marginal surfaces at the edges of two adjacent units 10 and the intermediate butt joint.

In FIG. 3(b) it will be seen that one end 10a of each unit 10 is formed as a raised lip portion which overlaps the other end 10b of an adjacent unit to provide a seal.

External formwork 34, 36 is then placed in position substantially parallel to and spaced from walls 14, 16 respectively and to a level above top wall 12 to define the thickness of the concrete which will eventually surround the culvert unit 10. The formwork may be permanent or temporary and may be of GRC or other suitable material. Alternatively, the side walls of the trench through which the culvert is to pass could constitute the outer wall members to contain the concrete thus dispensing with the need for external formwork. A roof reinforcement 38 is then placed in position over the top wall 12 and concrete poured between the walls 14, 16 and formwork 34, 36 until it fills the spaces therebetween and covers the top wall 12 to the desired height and then allowed to set. The culvert is then ready for use. It is believed that the culvert could be used as soon as the unit 10 has been secured in position and before the concrete is poured. The space above the top surface of the concrete will then be infilled with the appropriate material, such as soil, to bring it up to the level of the surrounding area. The depth of the material will, of course, vary according to the circumstances and situation of the culvert.

FIGS. 4 and 5 show another embodiment of a culvert unit 40 and like parts corresponding to the embodiment of FIG. 1 are given like reference numerals. In FIG. 4, the unit 40 has side walls 14, 16 terminating in feet 42, 44 respectively. The feet 42, 44 are alternative arrangements and in general a unit 40 would have the same kind of foot at the lower end of each wall. It will be seen that the foot 42 has a downwardly extending, elongate projection 42a positioned substantially in the same plane as the wall 14 while the foot 44 has a downwardly extending, elongate projection 44a extending from the distal edge of the foot 44.

To construct the culvert with a unit 40 having feet 42 or 44, a trench is excavated as before and concrete base 22 poured. While the concrete 22 is still wet, the unit 40 is placed in position. The section of the foot 42 or 44 normal to the walls 14, 16 bears on the wet concrete to prevent the unit sinking in too far while the projection 42a or 44a projects down into the concrete. The projection 42a or 44a extending into the set concrete provides a watertight joint between the feet of the unit and the upper surface 22a of the base and in addition, prevents the side walls of the unit from being pushed in by the pressure of wet concrete when the concrete for the walls and roof surface is poured. The roof reinforcement 38 is then placed in position and concrete poured between the walls 14, 16 and formwork as before and over the top wall 12 to the required thickness. The junction between the side walls 14, 16 and top wall 12 could be square, splayed or rounded depending upon the size of the unit and the structural strength required. In addition the sides of the unit 10 or 40 could be strengthened in a manner similar to that shown for the top wall 12 on larger units. This strengthening should preferably be continuous around the unit to provide structural continuity. For small culverts, the units could be manhandled into position but for larger ones, the unit may require some mechanical handling.

While embodiments of the invention have been described using GRC units, other fibre-reinforced materials could be used such as asbestos cement or other materials such as steel. Furthermore, the feet 18, 20 or 42 or 44 could be directed inwardly of their associated side walls instead of outwardly as shown or they could be formed with their walls as an inverted T-shape.

What I claim is:

1. A method of constructing a culvert, tunnel or the like comprising securing on a prepared base a prefabricated unit comprising opposed side walls joined by a top wall, each side wall terminating in a foot member including a first portion extending substantially normally to a respective side wall the feet members being supported by the base, and in which said feet members are formed with downwardly extending elongate projections, the base is of a plastic building material and placing the unit in position before said material has set to form the floor of the culvert such that the feet members first portions bear on the surface of said material and said projections project into the material, whereby when the material has set the projections assist in securing the unit in position and povide a substantially watertight joint.

2. A method according to claim 1, further comprising inserting a flexible sealant between the feet members and the base surface to form a liquid-tight seal between each foot member and the base prior to securing the prefabricated unit to the base.

3. A method according to claim 1 further comprising prior to the securing step placing the unit between outer wall members in spaced relation to said side walls of said unit and after the securing step filling the space between the outer wall members and the side walls of said unit with a solid material.

4. A method according to claim 3 in which said outer wall members terminate at their upper edges above the top of said prefabricated unit, and the filling step comprises pouring a plastic building material between said side walls and said outer wall members to a height which covers said top wall and allowing the plastic building material to set.

5. A method according to claim 1 or 2 in which the unit is prefabricated of glass-fibre reinforced cement.

6. A method according to claim 1 or 2 comprising the steps of securing a plurality of said prefabricated units in line and sealing the joints between the edges of the sidewalls and top walls of adjacent prefabricated units by means of a length of adhesive material.

7. A culvert, tunnel or the like comprising a prefabricated unit secured to a base surface, the unit comprising opposed side walls joined by a top wall, each side wall terminating in a foot member including a first portion extending substantially normal to a respective side wall the feet members supported on and secured to said base surface, in which the base is formed of a plastic building material, and said feet members are formed with downwardly extending elongate projections, the arrangement being such that, in construction, the unit is placed in position on said base before said plastic building material has set to form the floor of the culvert so that the feet member first portions bear on said base surface and said projections project into the building material.

8. A culvert, tunnel or the like according to claim 7, in which there is a liquid-tight seal between the feet and the base surface.

9. A culvert, tunnel or the like according to claim 7, in which said side and top walls of said unit are surrounded by a plastic building material which has been allowed to set.

10. A culvert, tunnel or the like according to claim 7, in which the unit is prefabricated from glassfibre reinforced cement.

11. A culvert, tunnel or the like, according to claim 7 having a flexible sealant inserted between the feet members and the base surface to provide a liquid-tight seal.

12. A culvert, tunnel or the like according to claim 7 in which each said projection is substantially in the same plane as its associated side wall.

13. A culvert, tunnel or the like, according to claim 7 in which each projection extends downwardly from the distal edge of its associated foot member.

14. A culvert, tunnel or the like, according to claim 7 in which said unit is provided with at least one externally ribbed wall surface, and wherein the ribs of said ribbed wall surface are provided internally with elongate reinforcing members.

15. A method according to claim 6 wherein said adhesive material comprises a foil-faced bituminous sealing strip.

* * * * *